United States Patent
Shinohara

(10) Patent No.: US 7,206,603 B2
(45) Date of Patent: Apr. 17, 2007

(54) CELLULAR RADIO TELEPHONE SET

(75) Inventor: Masahito Shinohara, Minato-ku (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 11/128,093

(22) Filed: May 11, 2005

(65) Prior Publication Data

US 2005/0208963 A1 Sep. 22, 2005

Related U.S. Application Data

(62) Division of application No. 10/287,853, filed on Nov. 1, 2002.

(30) Foreign Application Priority Data

Nov. 21, 2001 (JP) .............................. 2001-355498

(51) Int. Cl.
*H04B 1/38* (2006.01)
(52) U.S. Cl. .................. 455/557; 455/556.1; 455/574; 455/343.5; 710/313; 710/305
(58) Field of Classification Search ................ 455/557, 455/556.1–556.2, 344–349, 569.1, 575.1, 455/550.1, 424, 425, 456.5, 456.6, 561, 95, 455/100, 343.1, 343.2, 343.5, 569.2, 90.3, 455/572, 573, 575.6, 552.1, 128, 127.1; 710/131, 710/305, 15, 62–74, 8–14, 16–19, 313, 102, 710/103, 100, 126, 104; 320/115, 163, 105, 320/111–114, 128, 134, 161–164; 395/882, 395/284, 286, 500, 200.83, 280, 306, 281; 713/300, 320, 324, 340
See application file for complete search history.

(56) References Cited

U.S. PATENT DOCUMENTS 5,987,609 A 11/1999 Hasebe (Continued)

FOREIGN PATENT DOCUMENTS

EP 0 800 322 A2 10/1997

(Continued)

OTHER PUBLICATIONS

Untranslated Office Action issued by Japanese Patent Office on May 17, 2005 in connection with corresponding Japanese application No. 2001-355498.
English translation of relevant portion of Examiner's comments in Japanese Office Action issued May 17, 2005 submitted in lieu of statement of relevancy of prior art to present invention.

(Continued)

*Primary Examiner*—Edward F. Urban
*Assistant Examiner*—Charles Chow
(74) *Attorney, Agent, or Firm*—Osterlenk, Faber, Gerb & Soffen, LLP

(57) ABSTRACT

This invention relates to a cellular radio telephone set having a USB peripheral circuit which realizes a USB connection function. When the cellular radio telephone set is connected to an information processing terminal apparatus via a USB cable, a voltage Vbus supplied from the information processing terminal apparatus is regulated and supplied to the USB peripheral circuit. When the cellular radio telephone set is not connected to the information processing terminal apparatus via the USB cable, an application CPU which controls the USB peripheral circuit is shifted to a sleep mode.

2 Claims, 2 Drawing Sheets

U.S. PATENT DOCUMENTS

| | | | |
|---|---|---|---|
| 6,946,817 B2 * | 9/2005 | Fischer et al. | 320/132 |
| 2002/0073334 A1 | 6/2002 | Sherman et al. | |
| 2003/0065934 A1 | 4/2003 | Angelo et al. | |

FOREIGN PATENT DOCUMENTS

| | | |
|---|---|---|
| GB | 2 369 205 | 4/2002 |
| GB | 2 380 356 | 4/2003 |
| JP | 2000-304840 | 11/2000 |
| JP | 2001-184146 | 7/2001 |
| JP | 2001-312334 | 11/2001 |

OTHER PUBLICATIONS

Untranslated Office Action issued by Japanese Patent Office on Jan. 10, 2006 in connection with corresponding Japanese application No. 2001-355498.

English translation of relevant portion of Examiner's comments in Japanese Office Action issued Jan. 10, 2006 submitted in lieu of statement of relevancy of prior art to present invention.

Search Report issued by European Patent Office on Mar. 10, 2006 in connection with corresponding European patent application No. EP 05 02 5223.

* cited by examiner

CELLULAR RADIO TELEPHONE SET

CROSS REFERENCE TO RELATED APPLICATION

This application is a divisional of U.S. application Ser. No. 10/287,853 filed Nov. 1, 2002 entitled CELLULAR RADIO TELEPHONE SET, which claims the benefit of Japanese Application No. 355498/2001 filed on Nov. 21, 2001, the contents of which are incorporated by this reference.

BACKGROUND OF THE INVENTION

1. Field of the Invention

The present invention relates to a cellular radio telephone set and, more particularly, to a cellular radio telephone set having a USB (Universal Serial Bus) peripheral circuit which realizes a USB connection function.

2. Description of the Prior Art

Cellular radio telephone sets are desired to have reduced size and weight for portability, and their internal batteries are also reduced in size and weight. However, a small-size, light-weight internal battery means a short service life. The cellular radio telephone must always be ON to ensure a long standby time because the user does not know when he/she may receive an incoming call. Therefore, the cellular radio telephone set must reduce its power consumption to prolong the standby time.

Recent cellular radio telephone sets are connected to information processing terminal apparatuses such as a personal computer (to be simply referred to as a PC hereinafter) and a PDA (Personal Digital Assistants), realizing information exchange with the information processing terminal apparatuses and mobile communication using the telephone network of the cellular radio telephone set. At this time, the information processing terminal apparatus and cellular radio telephone set are connected using, e.g., a USB.

In the use of the USB, the cellular radio telephone set must be newly equipped with a USB peripheral circuit such as a USB device controller circuit. Power for operating the USB peripheral circuit is further required.

For the USB, a suspend mode is generally prepared. Using the suspend mode can reduce the power consumption of the USB peripheral circuit when the cellular radio telephone set is not connected to the information processing terminal apparatus.

Even the suspend mode cannot completely eliminate the power consumption of the USB peripheral circuit, and a current of about 500 mA may flow at maximum. Demands have arisen for a further improvement in this respect.

SUMMARY OF THE INVENTION

The present invention has been made in consideration of the above situation, and has as its object to provide a cellular radio telephone set having a USB connection function capable of minimizing the power consumption of the internal battery of the cellular radio telephone set both when the cellular radio telephone set is connected to an information processing terminal apparatus via a USB cable and when it is not connected to it.

To achieve the above object, according to the first principal aspect of the present invention, there is provided a cellular radio telephone set having a USB peripheral circuit which realizes a USB connection function, wherein when the cellular radio telephone set is connected to an information processing terminal apparatus via a USB cable, a voltage Vbus supplied from the information processing terminal apparatus is regulated and supplied to the USB peripheral circuit, and when the cellular radio telephone set is not connected to the information processing terminal apparatus via the USB cable, an application CPU which controls the USB peripheral circuit is shifted to a sleep mode.

In the cellular radio telephone set according to the first principal aspect, the sleep mode includes a low-power consumption operation mode.

In the cellular radio telephone set according to the first principal aspect, whether the cellular radio telephone set is connected to the information processing terminal apparatus via the USB cable is determined by detecting presence/absence of the voltage Vbus supplied from the information processing terminal apparatus.

To achieve the above object, according to the second principal aspect of the present invention, there is provided a cellular radio telephone set having a USB connection function, comprising a USB connector which is connected to a USB cable connected to an information processing terminal apparatus including a personal computer, a USB device controller circuit for communicating with the information processing terminal apparatus via the USB connector connected to the USB cable, an application CPU which controls the whole USB, a control CPU which controls the whole cellular radio telephone set, a regulator circuit which converts a voltage Vbus supplied from the information processing terminal apparatus via the USB cable into a voltage for the USB device controller circuit, and a Vbus detection circuit which detects presence/absence of the voltage Vbus.

In the cellular radio telephone set according to the second principal aspect, the USB device controller circuit comprises a D+ pull-up circuit which pulls up a signal D+ for data communication with the information processing terminal apparatus, a controller which controls the D+ pull-up circuit, and a transmission/reception circuit which performs transmission/reception of USB data communication.

As is apparent from the above aspects, according to the present invention, the cellular radio telephone set having the USB connection function can minimize the power consumption of the internal battery of the cellular radio telephone set both when the cellular radio telephone set is connected to an information processing terminal apparatus via a USB cable and when it is not connected to it.

The present invention can reduce the power consumption of the internal battery in the standby state of the cellular radio telephone set and prolong the standby time.

The above and many other objects, features and advantages of the present invention will become manifest to those skilled in the art upon making reference to the following detailed description and accompanying drawings in which a preferred embodiment incorporating the principle of the present invention is shown by way of an illustrative example.

DETAILED DESCRIPTION OF THE PREFERRED EMBODIMENT

A preferred embodiment of the present invention will be described in detail below with reference to the accompanying drawings.

In the present invention, a USB peripheral circuit in a cellular radio telephone set is operated by only power supplied from an information processing terminal apparatus such as a PC serving as a host, preventing the consumption of the internal battery of the cellular radio telephone set. When the cellular radio telephone set is not connected to the information processing terminal apparatus such as a PC, the application CPU is also shifted to a sleep mode, i.e., low-power consumption operation mode, reducing the power consumption of the internal battery of the cellular radio telephone set.

The present invention comprises a circuit which regulates a voltage Vbus supplied from the information processing terminal apparatus and supplies the regulated voltage to the USB peripheral circuit, and a circuit which detects Vbus. Vbus is supplied to a USB device controller circuit to prevent the consumption of the internal battery of the cellular radio telephone set. The application CPU is shifted to the low-power consumption operation mode to reduce the power consumption of the internal battery of the cellular radio telephone set.

Figure 1:
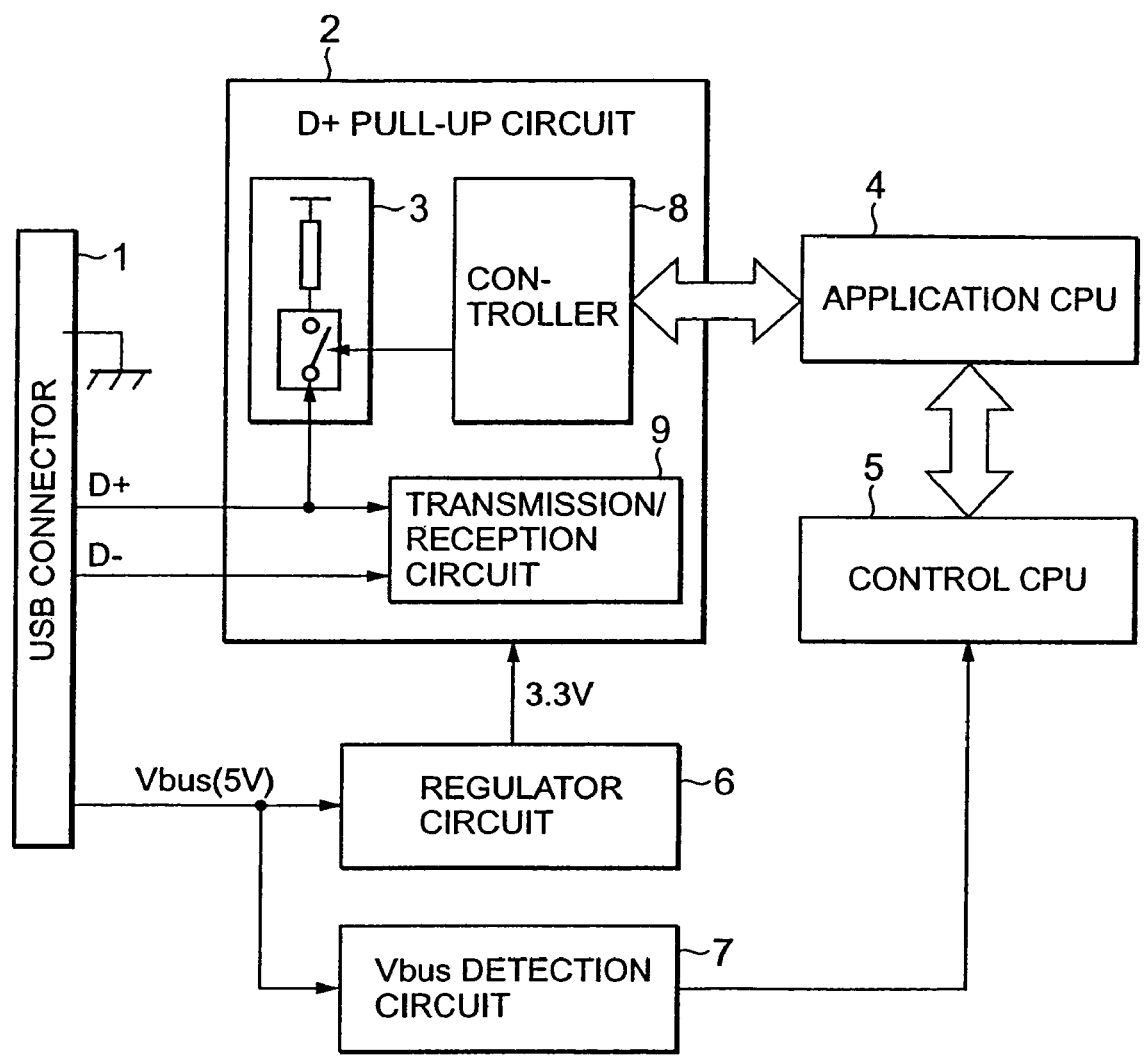
FIG. 1 is a block diagram showing the power control arrangement of the USB peripheral circuit of a cellular radio telephone set according to an embodiment of the present invention.

FIG. 1 is a block diagram showing the power control arrangement of the USB peripheral circuit of the cellular radio telephone set according to the embodiment of the present invention.

The cellular radio telephone set of the embodiment comprises a USB connector 1 which is connected to a USB cable connected to an information processing terminal apparatus such as a PC, a USB device controller circuit 2 for communicating with the information processing terminal apparatus via the USB connector 1 connected to the USB cable, an application CPU 4 which controls the whole USB, a control CPU 5 which controls the entire cellular radio telephone set, a regulator circuit 6 which converts the voltage Vbus supplied from the information processing terminal apparatus via the USB cable into a voltage for the USB device controller circuit 2, and a Vbus detection circuit 7 which detects the presence/absence of the voltage Vbus.

The USB device controller circuit 2 comprises a D+ pull-up circuit 3 which pulls up a signal D+ for data communication with the information processing terminal apparatus, a controller 8 which controls the D+ pull-up circuit 3, and a transmission/reception circuit 9 which performs transmission/reception of USB data communication.

As shown in FIG. 1, the cellular radio telephone set of the embodiment comprises the regulator circuit 6 which converts 5V Vbus into 3.3V and supplies 3.3V to the USB device controller circuit 2. This can prevent the power consumption of the internal battery of the cellular radio telephone set.

The cellular radio telephone set of the embodiment further comprises the Vbus detection circuit 7. When the Vbus detection circuit 7 detects the absence of Vbus, the control CPU 5 shifts the application CPU 4 to the sleep mode, thereby reducing the power consumption. When the Vbus detection circuit 7 detects the presence of Vbus, the control CPU 5 wakes up the application CPU 4. The USB device controller circuit 2 is so controlled as to pull up D+. A sequence of communicating with the information processing terminal apparatus such as a PC is realized.

The cellular radio telephone set of this embodiment will be explained in more detail with reference to FIG. 1.

The regulator circuit 6 converts 5V Vbus supplied via the USB connector 1 into 3.3V, and supplies this regulated voltage (3.3V) to the USB device controller circuit 2.

The USB device controller circuit 2 incorporates the pull-up circuit 3 which pulls up D+ under the control of the controller 8. The cellular radio telephone set comprises the Vbus detection circuit 7. A Vbus detection signal from the Vbus detection circuit 7 is sent to the control CPU 5. The control CPU 5 shifts the application CPU 4 to the sleep mode or wakes it up on the basis of the Vbus detection signal.

When the cellular radio telephone set is not connected to the information processing terminal apparatus such as a PC, no Vbus, D+, or D− is supplied to the cellular radio telephone set. In this state, no power is supplied to the USB device controller circuit 2. At this time, the Vbus detection circuit 7 detects that no Vbus is supplied. The control CPU 5 shifts the application CPU 4 to the low-power consumption operation mode (e.g., decreases the operation clock or turns off the power supply of a specific block). Accordingly, the power consumption of the internal battery in the standby state of the cellular radio telephone set can be reduced.

When the cellular radio telephone set is connected to the information processing terminal apparatus, Vbus is converted into 3.3 V by the regulator circuit 6 and then supplied to the USB device controller circuit 2. The Vbus detection circuit 7 detects Vbus, and a Vbus detection signal is recognized by the control CPU 5.

Figure 2:
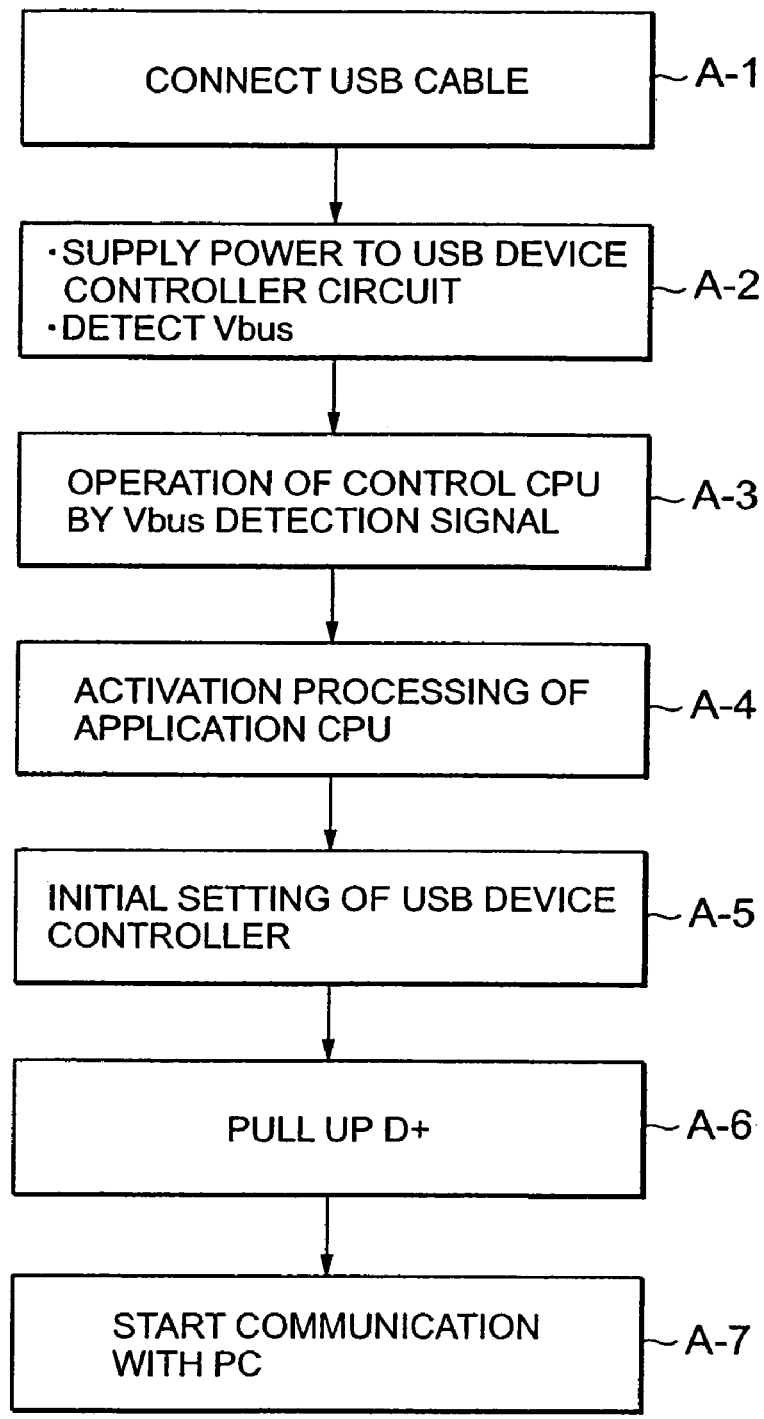
FIG. 2 is a flow chart showing the operation of the cellular radio telephone set shown in FIG. 1.

The subsequent operation will be explained with reference to the flow chart of FIG. 2. If the information processing terminal apparatus and cellular radio telephone set are connected by a USB cable (A-1), the Vbus detection circuit 7 detects Vbus (connection to the host). At the same time, power is supplied to the USB device controller circuit 2 (A-2).

The control CPU 5 wakes up the application CPU 4 on the basis of a Vbus detection signal from the Vbus detection circuit 7 ((A-3) and (A-4)). After the end of activation, the application CPU 4 initializes the USB device controller circuit 2 (A-5).

The controller 8 and D+pull-up circuit 3 of the USB device controller circuit 2 pull up D+ (A-6). In response to D+ pull-up operation, USB communication starts (A-7).

Note that execution of D+ pull-up operation before activation of the application CPU causes a problem in USB connection and should be avoided.

What is claimed is:

1. A mobile radio telephone set having a USB connection function, comprising:
    a USB connector operative to be connected to a USB cable connected to an information processing terminal apparatus;
    a USB device controller circuit for communicating with the information processing terminal apparatus via the USB connector connected to the USB cable;
    an application CPU operative to control the USB;
    a control CPU operative to control the mobile radio telephone set and to shift the mobile radio telephone set to a sleep mode when a presence of a voltage Vbus supplied from the information processing terminal apparatus via the USB cable is not detected;
    a regulator circuit operative to convert the voltage Vbus into a voltage to power the USB device controller circuit; and a Vbus detection circuit operative to detect the presence of the voltage Vbus.

2. The telephone set according to claim 1, wherein said USB device controller circuit comprises:

a D+ pull-up circuit operative to pull up a signal D+ for data communication with the information processing terminal apparatus;

a controller operative to control said D+ pull-up circuit; and a transmission/reception circuit operative to perform transmission/reception of USB data communication.

* * * * *